Sept. 15, 1925.

F. HAMEL

AUTOMOBILE CHASSIS

Filed Dec. 3, 1923

1,553,527

Inventor
Fred Hamel

By Whittemore Hulbert Whittemore
& Belknap   Attorneys

Patented Sept. 15, 1925.

1,553,527

UNITED STATES PATENT OFFICE.

FRED HAMEL, OF TOLEDO, OHIO, ASSIGNOR TO THE GENDRON WHEEL CO., OF TOLEDO, OHIO, A CORPORATION OF OHIO.

AUTOMOBILE CHASSIS.

Application filed December 3, 1923. Serial No. 678,314.

*To all whom it may concern:*

Be it known that I, FRED HAMEL, a citizen of the United States of America, residing at Toledo, in the county of Lucas and State of Ohio, have invented certain new and useful Improvements in Automobile Chassis, of which the following is a specification, reference being had therein to the accompanying drawings.

This invention relates to children's vehicles and relates more particularly to the seats of such vehicles and the supports therefor.

It is the object of the invention to provide a seat construction having a particular adaptation to children's vehicles simulating automobiles, said construction comprising a seat and a support mounting said seat upon the frame of the vehicle and being formed preferably of sheet metal.

In the drawings:—

Figure 1:
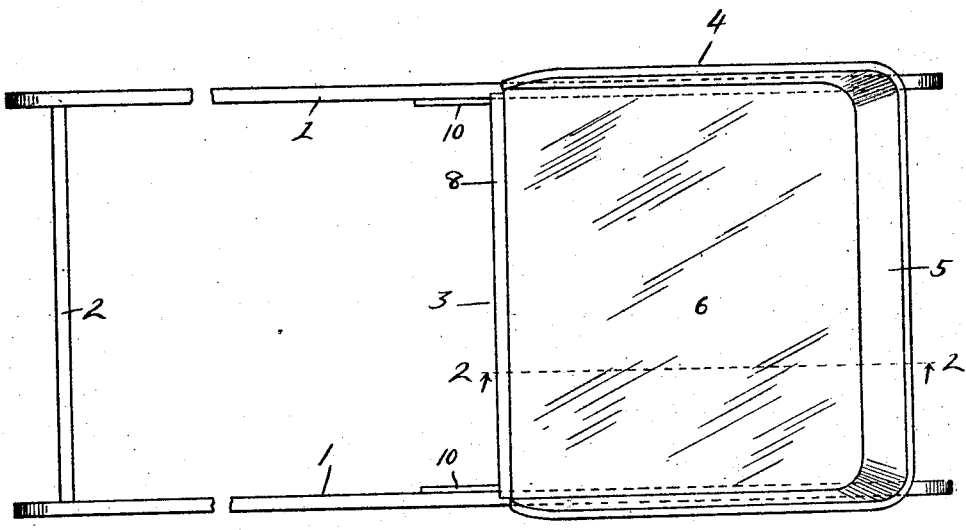
Figure 1 is a plan view of the frame of a child's vehicle showing a seat secured thereupon in accordance with the invention.
Figure 2:
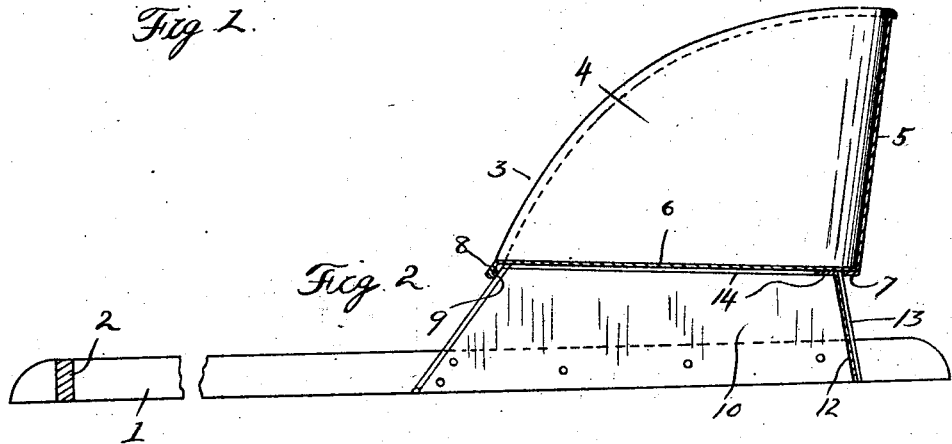
Figure 2 is a sectional view thereof taken on line 2—2 of Figure 1.
Figure 3:
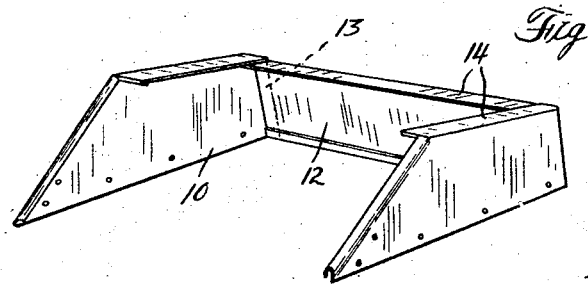
Figure 3 is a perspective view of the seat support.

In these views the reference character 1 designates a pair of sill members which may be formed of wood, said members being rigidly connected at their forward ends by a cross bar 2 which may be also of wood. Upon the rear ends of the sills 1 a seat 3 is supported and is utilized to rigidly connect said ends of the sills, thus obviating the necessity for any rear cross bar corresponding to the front member 2. The seat 3 is formed of sheet metal, the sides 4 and back 5 of said seat being an integral piece and the seat proper 6 being a separate sheet metal member. The lower edge of the member 4, 5 is inwardly flanged as indicated at 7, the member 6 resting upon said flange and being rigidly secured thereto, preferably by spot welding. The forward edge of the seat proper is formed with a short depending flange 8, the lower edge of which is rearwardly beaded as indicated at 9.

A support for the seat 3 is formed by sheet metal side pieces 10 nailed to the sills 1 as indicated at 11 and by a sheet metal cross piece 12 extended between the rear ends of the members 10, the latter being flanged as indicated at 13 to overlap the ends of the member 12 and being spot welded thereto. The upper margins of the members 10 and 12 are flanged as indicated at 14 to support the seat 3 and said flanges 14 are spot welded to the member 6 of said seat. Preferably the flanges 14 of the members 10 have a slight upward inclination from back to front so that the seat is mounted at a slight corresponding inclination. Also it is preferred to incline the forward edges of the members 10 forwardly as they extend downwardly at an angle of approximately 45°.

The described construction provides a strong seat, and a rigid mounting thereof upon the frame and at the same time constitutes a portion of the frame rigidly spacing the rear ends of the sills 1. The members 10 and 12 are formed separately, primarily to permit using smaller pieces of material therefor, which material would otherwise be scrapped.

What I claim as my invention is:—

1. In a vehicle construction, the combination with a pair of sill members, and a cross piece rigidly connecting the forward ends thereof, of a seat mounted upon the rear ends of said sill members, and a sheet metal support for said seat engaged between and forming the sole connection for the rear end portions of said sill members.

2. The combination with the seat, and the spaced sills of a vehicle, of a unitary support for said seat formed of sheet metal and mounting the seat at an elevation above the sills, said support comprising a substantially vertical cross piece extending between the sills beneath the rear portion of the seat, and side pieces secured to and forwardly extending from the ends of said cross piece beneath the seat ends and secured to the inner faces of said sills.

In testimony whereof I affix my signature.

FRED HAMEL.